(12) United States Patent
Ashman

(10) Patent No.: US 8,272,294 B2
(45) Date of Patent: Sep. 25, 2012

(54) HANDLEBAR TWIST-GRIP CONTROL LOCK

(76) Inventor: Paul Geoffrey Ashman, Minneapolis, MN (US)

( * ) Notice: Subject to any disclaimer, the term of this patent is extended or adjusted under 35 U.S.C. 154(b) by 684 days.

(21) Appl. No.: 12/363,787

(22) Filed: Feb. 1, 2009

(65) Prior Publication Data

US 2009/0193930 A1 Aug. 6, 2009

Related U.S. Application Data

(60) Provisional application No. 61/063,167, filed on Feb. 1, 2008.

(51) Int. Cl.
*G05G 5/06* (2006.01)
(52) U.S. Cl. .......................................................... 74/531
(58) Field of Classification Search ................ 74/488, 74/489, 509, 531, 551.8, 551.9
See application file for complete search history.

(56) References Cited

U.S. PATENT DOCUMENTS

| | | | | |
|---|---|---|---|---|
| 2,776,579 A * | 1/1957 | Nichel, Jr. | ......................... | 74/488 |
| 3,752,006 A * | 8/1973 | Bartlett | ............................ | 74/489 |
| 3,782,219 A * | 1/1974 | Beck et al. | ....................... | 74/531 |
| 3,982,446 A * | 9/1976 | Van Dyken | ...................... | 74/488 |
| 4,060,008 A * | 11/1977 | Wilkinson | ........................ | 74/488 |
| 4,137,793 A * | 2/1979 | Sowell | .............................. | 74/488 |
| 4,256,197 A * | 3/1981 | Kiser, Jr. | ......................... | 180/335 |
| 4,286,700 A * | 9/1981 | Morris et al. | ................... | 477/193 |
| 4,287,785 A * | 9/1981 | Hunt | ................................ | 74/488 |
| 4,364,283 A * | 12/1982 | Ricardo | ........................... | 74/489 |
| 4,938,733 A * | 7/1990 | Patterson | ......................... | 474/80 |
| 5,065,988 A * | 11/1991 | Wedell | ............................ | 267/149 |
| 5,893,295 A * | 4/1999 | Bronnert | .......................... | 74/488 |
| 6,491,555 B2 * | 12/2002 | Kitsu et al. | ....................... | 440/87 |
| 6,820,710 B2 * | 11/2004 | Fechner | ........................ | 180/170 |
| 6,978,694 B2 * | 12/2005 | Peppard | ........................... | 74/489 |
| 8,056,693 B2 * | 11/2011 | Christini et al. | ............ | 192/48.92 |
| 2003/0221506 A1 * | 12/2003 | Wesling et al. | .............. | 74/501.6 |
| 2004/0194571 A1 * | 10/2004 | Zagrodnik et al. | ........... | 74/551.8 |

* cited by examiner

*Primary Examiner* — Vicky Johnson
(74) *Attorney, Agent, or Firm* — Patterson Thuente Christensen Pedersen, P.A.

(57) ABSTRACT

A control-holding device to be mounted so as to selectively engage the end of a twist-grip control and hold it still at the discretion of the user, the device including an interchangeable mounting means that may be specific to the machine to which it is attached, a stationary element connected to the machine through the mounting means, a moving element which is manipulated to allow or disallow engagement with the twist-grip, an elastic or propulsive element that presses the moving element to engage the twist-grip when the moving element is manipulated in the prescribed way, and a standard means to mount accessories onto the outboard side of the mechanism.

17 Claims, 5 Drawing Sheets

HANDLEBAR TWIST-GRIP CONTROL LOCK

CROSS-REFERENCE TO RELATED APPLICATIONS

This application claims priority to U.S. Provisional Application No. 61/063,167, filed Feb. 1, 2008.

TECHNICAL FIELD

The invention relates to a twist-grip control apparatus for manually operated machinery such as motorcycles, and more particularly to a device that is both triggered and released through user manipulation of the device, to hold the twist-grip still, and can be overridden while active by the user.

BACKGROUND OF THE INVENTION

The concept of a device to hold a motorcycle throttle still is well-known, and more than 30 thirty years old. Many have been patented, and many are currently on the market. The invention distinguishes itself by the combination of its simplicity, safety, reliability, ease of use, easy setup, range of application, simple appearance, and its taking up no room on the handlebars. An evaluation of the prior art resulted in the selection of the above references, which appear to be representative of the basic sorts of solutions so far offered.

Here follows a summary of the basic methods so far employed.

Some employ a threaded member to interfere to varying degrees with the portion of the throttle sleeve that is inside the control housing given on the motorcycle. This method depends greatly for its practicality on a preexisting threaded hole in the control pod. If this hole is not present, installation is much more involved. As well, engineering smooth, precise, repeatable action that guarantees overrideability in an emergency has proven challenging with this method.

Others append mechanical teeth to the fixed portion of the handlebar and to the portion that rotates with the twist-grip, and make provision for selectively engaging them together, locking the twist-grip in position. One inboard side approach presents an uneasy tension between complexity, ugliness and high parts count on one hand, and having to make a profusion of expensive application-specific parts on the other. As well, the approach of interlocking gear teeth requires overrideability to be specifically engineered into the system to a degree not present in the other methods, since gear teeth tend to interlock positively.

Others provide a selective frictional engagement between the outboard moving end of the twist-grip and the fixed handlebar. Selective outboard frictional engagement is also employed by the invention. The application-specific features of the outboard end of the handlebars are typically confined within the perimeter of the end of the grip, so special parts to engage them can be compact, inexpensive, and well-hidden. As well, no space on the handlebar is consumed, a major advantage to the user, as many accessories are best mounted on the handlebar. The biggest challenge of this method are that twist-grips have different amounts of axial play, and different biases as to where they sit within that play, and different ways that grips respond to pressure, so a good mechanism must be able to absorb that play. Conventional solutions have not met this challenge sufficiently. The next challenge of this method is to fully utilize the potential for broad applicability of a twist-grip locking device. Conventional solutions have absolutely not met this challenge, with some confined to hollow bars and others to external mounting on bars with modest-size internal threads.

Others provide a selective frictional engagement by external clamping action between some inboard portion of the twist-grip assembly, and some portion of the fixed handlebar or control pod. This inboard side approach, as with another mentioned above, presents an uneasy tension between complexity, ugliness and high parts count on one hand, and having to make a profusion of expensive application-specific parts on the other. These units also inevitably take up some axial room on the grip, the throttle sleeve, or the handlebar.

SUMMARY OF THE INVENTION

The twist-grip control device of the invention is fixed to the end of a handlebar which has a twist-grip, by means that vary by machine, but are substantially rigid and allow for the user to adjust the clearance between the device and the hand grip during installation. While under way, the user actuates the device by turning the locking collar in the conventional throttle-on direction, counterclockwise viewed from the end of the bar, until the collar's internal features clear a protrusion, such as a roll pin, on the stationary part of the device, and allow it to be propelled axially by the wave spring, into frictional contact with the handgrip. When the user desires to disengage the device, she takes hold of the locking collar, pulls it away from the twist-grip, and rotates it in the conventional throttle-off direction by ⅛ to ¼ turn, engaging the roll pin with a substantially coaxial cutout internal to the locking collar, which holds said collar away from the twist-grip. As an added safety measure, if circumstances require, the user can turn said collar so far in the throttle-off direction that the roll pin engages a decreasing-radius portion of the said internal cutout in the collar, allowing it to be locked frictionally in a disengaged position. In an emergency, the user simply turns the twist-grip closed, against the holding force, which is limited by the spring force in an embodiment. While the device is engaged, the user can adjust the setting at will by twisting the grip. There is a depression on the grip side of the device capable of receiving a ⅞" handlebar end inside it. The mounting means, including a number of adjustment shims, an application-specific nose, and adaptors necessary to use the most advantageous diameter of screw, fit against the bottom of said depression, the specific parts necessary depending on application, but the locking device itself remaining the same across many applications. The device is designed so that accessories can be mounted to the outboard side, with a standard mounting pattern.

BRIEF DESCRIPTION OF THE DRAWINGS

The invention can be more easily understood by reference to the drawings, in which.

DETAILED DESCRIPTION OF THE INVENTION

The discussion below refers particularly to an example embodiment of the invention, however the invention can be embodied in any number of ways. While the parts are shown with names, it is their function and operation that counts, and the definitions of the words shall not be taken as limiting the scope of the possible embodiments.

The attached drawings lay out in detail an example embodiment currently contemplated for the invention.

FIGS. 1-4 show a coarse representation of four different given motorcycle handlebar twist-grip setups, on which an embodiment of the invention is shown installed. Throttle sleeve 3 is fixed rotatably on handlebar 4. Grip 2 is typically pressed or clamped or glued to sleeve 3. These figures illustrate typical embodiments to apply twist-grip lock (#19, FIG. 5) to different situations.

Figure 1:
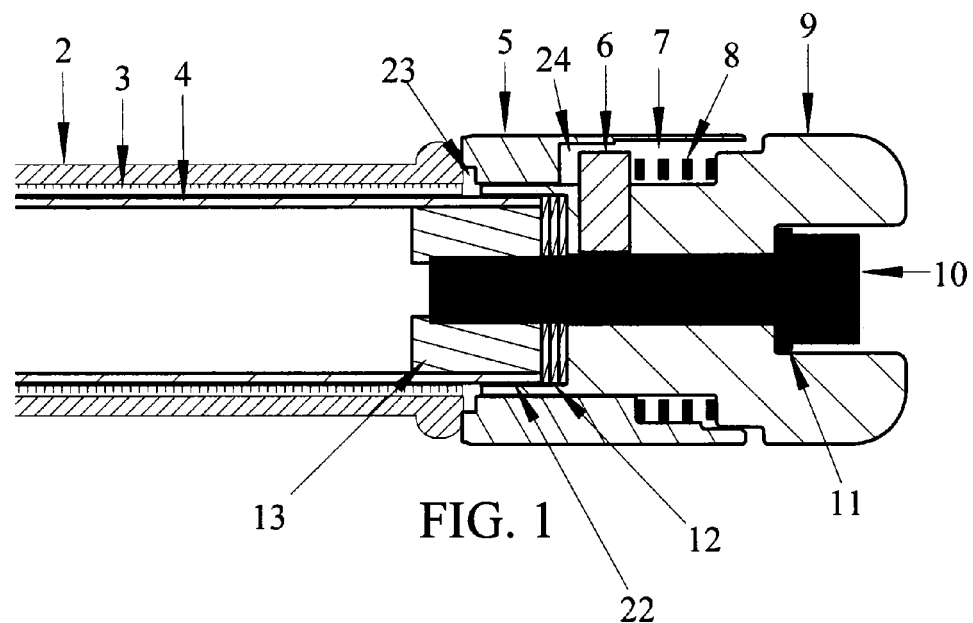
FIG. 1 is a cutaway view of an embodiment of the device depicted in an activated position in its simplest installation scenario, enveloping bar end to optimize clearance to a handlebar with a threaded hole.

FIG. 1 shows the simplest application of an embodiment of the invention. Handlebar 4 protrudes from grip 2 and sleeve 3, penetrating a mounting recess 22 of mandrel 9 to establish required clearance between grip 2 and collar 5. Handlebar 4 has internal threads 13, engaged by bolt 10, which runs through lock washer 11, mandrel 9, and shim stack 12. The number of shims is chosen to minimize clearance between collar 5 and grip 2 in the inactive (unlocked) state. Three shims 12 are depicted in this example. Collar 5 is shown at the rotational angle where actuating cutout 7 (refer to FIGS. 5-9) is aligned with a protruding element, such as a roll pin 6 assembled into mandrel 9, and thus sprung as a moveable element of the twist-grip control device into frictional contact with grip 2 by a propelling element, wave spring 8.

Figure 2:
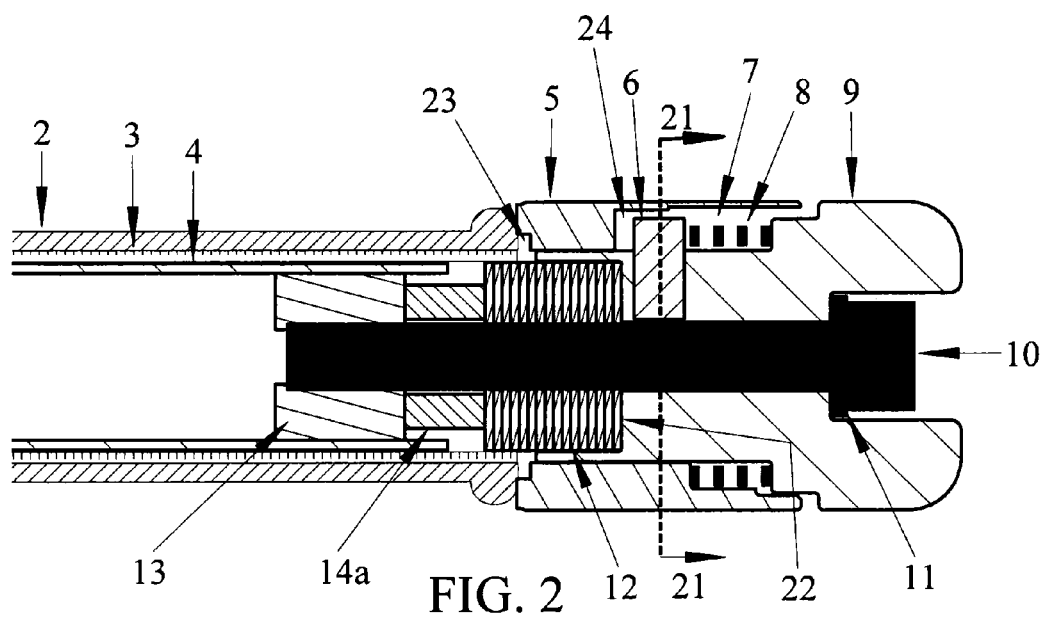
FIG. 2 is a cutaway view of an embodiment of the device depicted in an activated position and installed on a handlebar with recessed threads, which is itself recessed into the throttle sleeve, with an application-specific nose shown next to the handlebar internal threads, reaching where the spacers cannot go.

FIG. 2 shows an embodiment of the invention applied to a machine whose handlebar 4 is recessed inside sleeve 3, which is flush with grip 2, and whose internal threads 13 are recessed inside handlebar 4. Internal threads 13 are engaged by bolt 10, which runs through lock washer 11, mandrel 9, shim stack 12 and the simplest kind of nose 14a, in this case a bushing narrow enough to fit inside handlebar 4 and meet threads 13. The number of shims 12 is chosen to minimize clearance between collar 5 and grip 2 in the inactive (unlocked) state. Sixteen shims 12 are depicted in this example. Collar 5 is shown at the rotational angle where actuating cutout 7 (refer to FIGS. 5-9) is aligned with roll pin 6 assembled into mandrel 9, and thus sprung into frictional contact with grip 2 by wave spring 8. Note section view 21, which is the basis for FIGS. 6-8.

Figure 3:
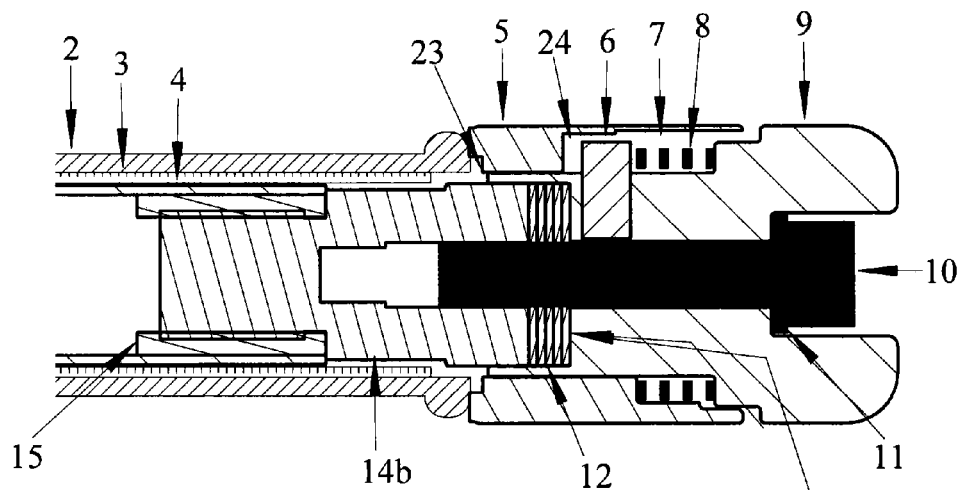
FIG. 3 is a cutaway view of an embodiment of the device depicted in an activated position and installed onto a handlebar with oversize female threads, where a large nose screws onto the female threads and a smaller screw attaches device to the nose.

FIG. 3 shows an embodiment of the invention applied to a machine whose handlebar 4 is recessed inside sleeve 3, which is recessed inside grip 2, and whose internal threads 15 are recessed inside handlebar 4, and of a larger diameter than the largest bolt that can go through mandrel 9. Internal threads 15 are engaged by nose 14b, in this case an adaptor that screws into bar 4 before locking device is attached. Nose 14b is engaged by bolt 10, which runs through lock washer 11, mandrel 9, and shim stack 12. The number of shims 12 is chosen to minimize clearance between collar 5 and grip 2 in the inactive (unlocked) state. Five shims 12 are depicted in this example. Collar 5 is shown at the rotational angle where actuating cutout 7 (refer to FIGS. 5-9) is aligned with roll pin 6 pressed into mandrel 9, and thus sprung into frictional contact with grip 2 by wave spring 8.

Figure 4:
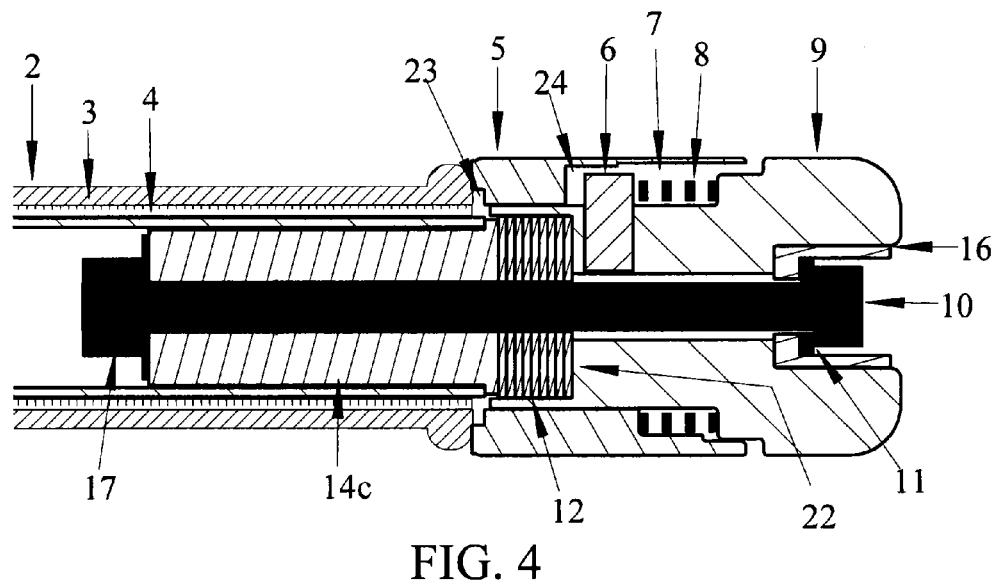
FIG. 4 is a cutaway view of an embodiment of the device depicted in an activated position and installed in a hollow handlebar, with elastomeric nose.

FIG. 4 shows an embodiment of the invention applied to a machine whose handlebar 4 barely protrudes from sleeve 3, which is flush with grip 2. A recess 23 in collar 5 ensures that the only contact between collar 5 and the twist grip is via grip 2. Handlebar 4 has no internal features and is hollow. Nose 14c is made of elastic material, and is engaged by a thinner bolt 10, which runs through lock washer 11, adaptor 16 for narrower screw, mandrel 9, shim stack 12 with narrower holes, nose 14, and flange nut 17. When tightened, nose 14c is squeezed by bolt 10 and nut 17, and expands against inside of handlebar 4, holding device (#19, FIG. 5) in place. The number of shims 12 is chosen to minimize clearance between collar 5 and grip 2 in the inactive (unlocked) state. Nine shims 12 are depicted in this example. Collar 5 is shown at the rotational angle where actuating cutout 7 (refer to FIGS. 5-9) is aligned with roll pin 6 assembled into mandrel 9, and thus sprung into frictional contact with grip 2 by wave spring 8.

Figure 5:
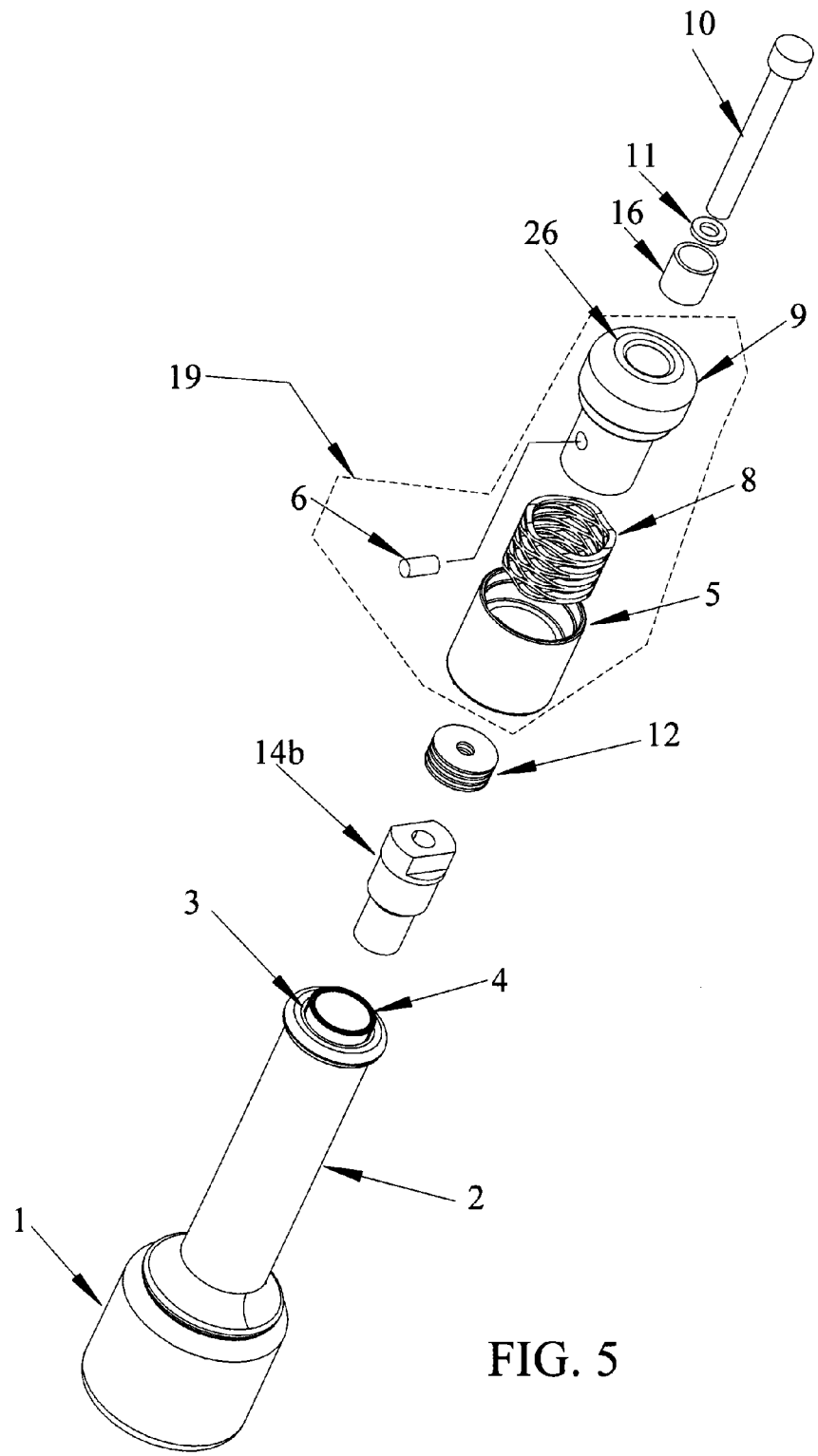
FIG. 5 is an exploded view of an embodiment of an assembly with typical components.

FIG. 5 is an exploded view of a general installation. Twist-grip locking device 19 is assembled at factory by pressing roll pin 6 into mandrel 9, screwing wave spring 8 over roll pin 6 onto mandrel 9, pressing collar 5 onto mandrel 9 against force of wave spring 8, then rotating collar 5 in throttle-off direction to engage roll pin 6 with internal cutout 24 of collar 5 which holds it in place against wave spring 8. From that point it can be treated as a unit for installation.

Figure 9:
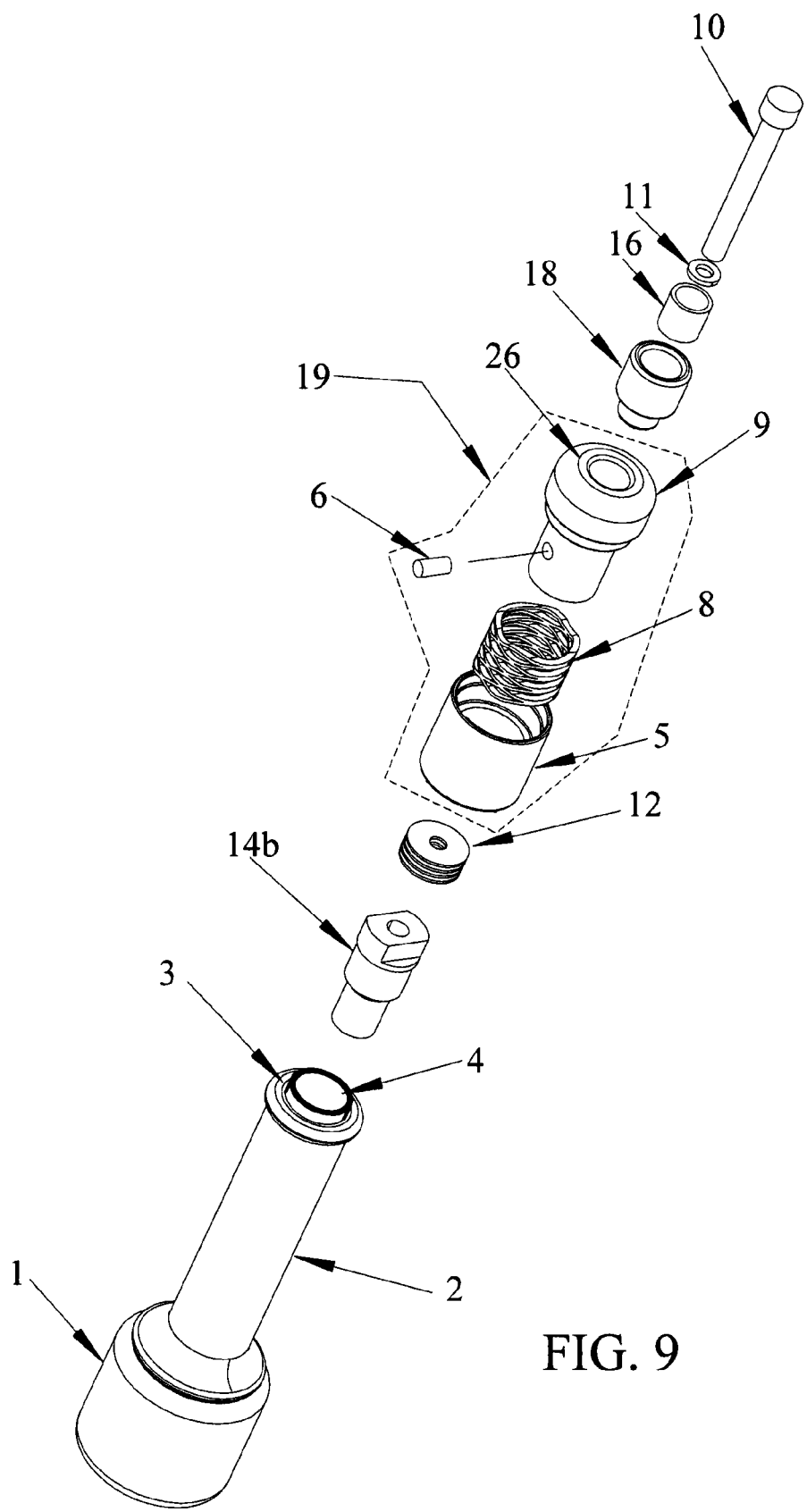
FIG. 9 is an exploded view of an embodiment of an assembly with typical components, showing also an accessory attachment on the end, as an alternate to the basic installation.

Control pod 1, grip 2, throttle sleeve 3 and handlebar 4 are given as part of the motorcycle. Nose 14b attaches to handlebar 4 by application-specific means, and twist-grip lock assembly 19 attaches to it with a mounting set comprising bolt 10, which passes through lock washer 11, screw adaptor 16, mandrel 9, shim stack 12, then engaging nose 14b. Alternatively, as depicted in FIG. 9, an accessory attachment 18, in this case clamp-on mirror adaptor, can be inserted at the outboard side 26 between screw adaptor 16 and mandrel 9.

Figure 6:
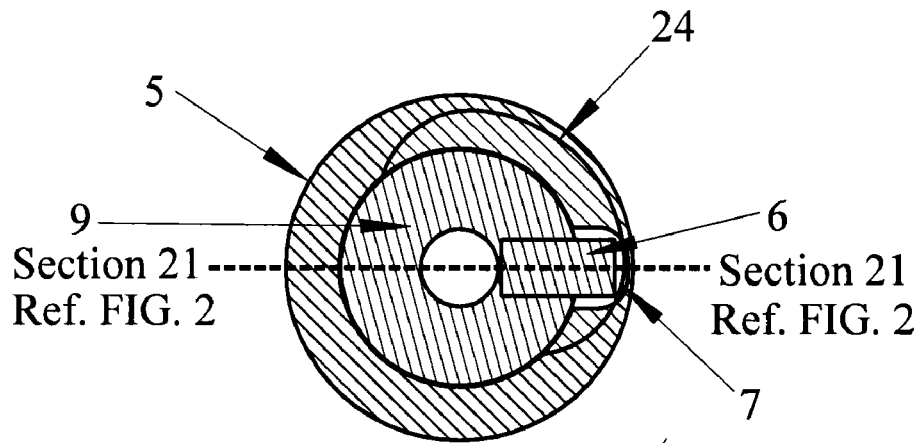
FIG. 6 is a section view of the internal collar and mandrel features regulating the motion of the collar, in the orientation that exists when the device is active.

FIG. 6 is a section view showing FIG. 2 section view 21, of collar 5 and mandrel 9 features aligned to admit collar 5 over roll pin 6 through actuating cutout 7, cut into collar 5. Collar 5 is pushed off mandrel 9 by wave spring 8 (not depicted in this view) and is not retained on mandrel 9 in this condition, unless unit is properly installed to a machine.

Figure 7:
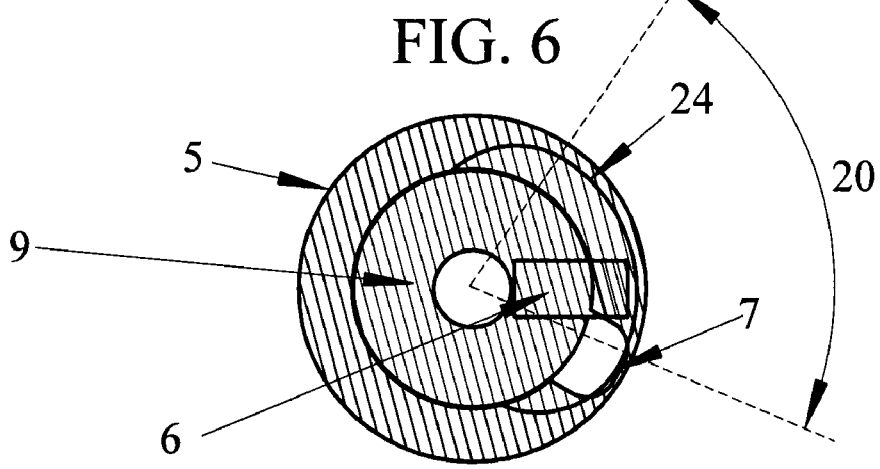
FIG. 7 is a section view of the internal collar and mandrel features regulating the motion of the collar, based on FIG. 6, with the collar in an alternate orientation, the most common orientation when the device is inactive.

FIG. 7 is a section view based on FIG. 6, depicting an alternate position of collar 5, with collar 5 rotated about 30 degrees so actuating cutout 7, cut into collar 5, is no longer aligned with roll pin 6. Collar 5 is pressed against roll pin 6 by wave spring (FIG. 2, item 8). Collar 5 is retained on mandrel 9 when in this alternate position.

Figure 8:
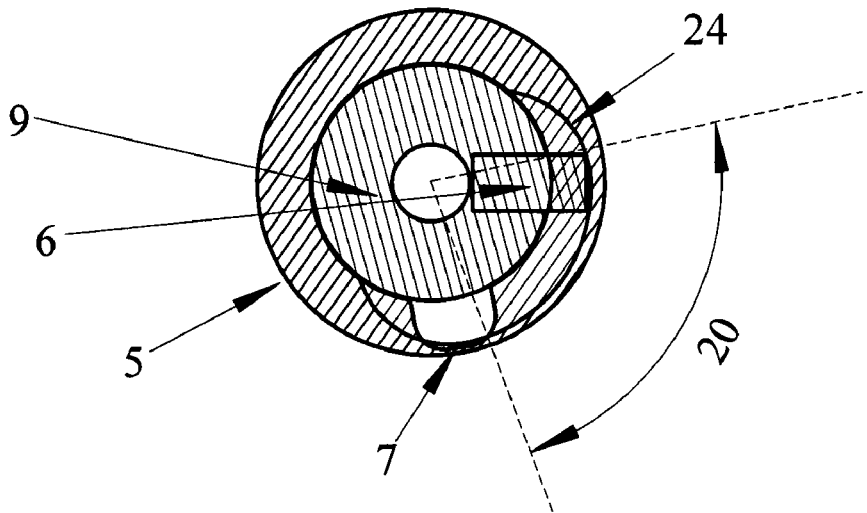
FIG. 8 is a section view based on FIG. 6, with the collar in an alternate orientation, namely the rotational angle where interference between a roll pin and the decreasing radius portion of the collar cutout locks device frictionally in the inactive position.

FIG. 8 is a section view based on FIG. 6, depicting an alternate position of collar 5, with collar 5 rotated until decreasing-radius portion 20 of internal cutout 24, cut into collar 5, impacts roll pin 6, taking up the clearance between mandrel 9 and collar 5, and establishing a condition of static friction between roll pin 6 and collar 5. This is the "locked off" condition, which is typically not necessary unless user's gloves overhang the grip, nudging on collar 5 unintentionally in normal operation of the machine, which can happen with short grips and big hands. Collar 5 is retained on mandrel 9 in this condition.

Here is an example of how an embodiment of the invention is used.

While underway, the user makes the determination that it will take less effort to put a greater force on the throttle only when it needs to be modulated, than to hold it open with a constant but lesser force. This happens where traffic is less, cross traffic minimal, and slowing down is not anticipated. At this point the user moves her hand outboard on the bar until her last finger or two are wrapped around the collar. She then rotates collar in the throttle-on direction, while holding the grip still with her first two fingers and thumb. The collar springs into the end of the twist-grip, holding it still.

The user is likely to have occasion to adjust her speed, which she will do by forcing the throttle further open or closed in the normal manner, but more forcefully. In an emergency, she forces the throttle shut in the normal manner.

When the user determines it would be safer or easier to hold the throttle open manually, she holds the collar between her first two fingers and thumb, and pulls it outward while turning in the throttle-off direction. If her hands are bigger than her grips and can rub on the collar and actuate the device accidentally, she can turn the collar till it locks frictionally.

The invention is conceived as a safe, simple, beautiful, reasonably easy-to-use means to hold a twist-grip control still during periods when the need to change its setting is not anticipated. The need for such a device became clear in the context of motorcycle touring. During prolonged operation of the machine, the operator's wrist tires from holding the throttle open against the closing force of the return springs.

Embodiments include means to hold the throttle still, at the discretion of the user, and ideally to release the throttle completely, also at the discretion of the user, without having to tune the device while underway.

Embodiments would not be readily noticeable and have a pleasant appearance, to meet modern aesthetics, which strongly favor clean, simple lines.

From a safety standpoint, the device must never hinder the user in voluntarily shutting the throttle.

From a business operations standpoint, it is advantageous for the device must be made of as few parts as possible, and be applicable to as many different machines as possible.

From a user standpoint, installation should be unintimidating, requiring minimal modification of the original machine, and minimal skill and time to maintain or adjust.

The invention addresses these and other needs in the art, in contrast with conventional solutions, including positive on/off operation, unlike conventional approaches in which the actuation force develops linearly. Embodiments include adequate tension and complete release, unlike some conventional solutions having short mechanical travel, a disadvantage. Embodiments also include inherent overrideability, to a greater degree than conventional approaches that do not involve an automatic release. Embodiments also present an elegant, simple appearance. Further, embodiments present non-intimidating or low-stakes installation, unlike conventional approaches. Embodiments provide wide applicability with application-specific fit each time, unlike any of the prior art, and have a low parts count and easy, wide-ranging adjustment. Embodiments also present a standard outboard form amenable to mounting diverse accessories, unlike any of the prior art.

Improvements over conventional solutions are numerous. Embodiments use a collar that is rotatable to allow or disallow its own linear movement to engage the twist-grip, but the rotary movement is not directly linked to the linear movement, indeed the rotary movement and the linear movement of engagement cannot happen simultaneously. Rather, it is the wave spring that presses the collar linearly into the twist-grip. The rotation of the collar merely allows it to happen. In a conventional approach, actuation is rotation both to actuate and to retract, whereas embodiments of the invention have the collar rotate to release the wave spring, but retraction involves both rotary and linear motion of the collar. The use of the wave spring to generate holding force in on/off fashion is an advantage of greater overrideability and a greater effective range of linear travel as installed. This is due to the low spring constant of the wave spring guaranteeing both a low maximum holding force and a slow decay in holding force as the collar travels further toward the twist-grip. Conventional solutions using ramps and balls might allow around 0.1" travel, which is within the range of axial play expected from a twist-grip assembly, opening the possibility of there being no way to adjust it to both adequately hold and completely release the twist-grip. Whereas conventional solutions can be changed to affect sleeve clearance to throttle sleeve within a range of only up to maybe 0.2", the invention can operate over a travel of about 0.2", and collar clearance can be adjusted within a range of 0.65", depending on application, and in many applications unit can operate with the handlebar end buried in the device, which conventional solutions cannot duplicate. Additionally, altering the configuration of at least one conventional solution would require breaking the seal of numerous o-rings and exposing the user to grease or oil coating the internal parts. The invention, in contrast, adjusts clearance without opening the device, runs without lubrication, and can be disassembled without tools, washed in the sink and reassembled and installed wet with no ill effect.

Since the mandrel of the invention is fixed rotationally and constitutes the end of the device and since there is room for a screw adaptor in the counterbore on the end, a user can mount accessories that interface with the mandrel in the same way as the screw adaptor. Another device has a rotating cap which is also the outboard face of his device, so any accessory mounted to it would rotate whenever the device was adjusted, which would be undesirable for most accessories. Another advantage of the invention is the low parts count. Whereas one example conventional unit has approximately fourteen moving parts, five proprietary parts and eighteen bought parts, nine of them unique, the invention in a similarly complex application has two moving parts, three proprietary parts and four bought parts, all unique.

The invention claimed is:

1. A twist-grip control device configured for mounting to a handlebar to selectively engage a twist-grip, the device comprising:
 a stationary element having an outboard side and configured to be coupled to, and stationary with respect to, the handlebar with the outboard side arranged away from the handlebar;
 a protruding element coupled to the stationary element and protruding relative to a first surface of the stationary element;
 a moveable element comprising an actuating cutout and an internal cutout, the internal cutout formed in a first surface of the moveable element, the actuating cutout and the internal cutout configured to interact with the protruding element, the moveable element configured to be arranged intermediate the outboard side of the stationary element and the twist-grip and at least partially surrounding the stationary element such that the first surface of the moveable element can oppose the first surface of the stationary element, the moveable element being moveable relative to the stationary element rotationally when the protruding element interacts with the internal cutout and linearly when the protruding element interacts with the actuating cutout; and a propelling element arranged proximate the stationary element and the moveable element, the propelling element having a first state when the protruding element interacts with the internal cutout, and a second state, when the protruding element interacts with the actuating cutout, in which the propelling element is configured to urge the moveable element linearly toward the twist-grip to engage the twist-grip.

2. The device according to claim 1, wherein the propelling element is arranged between the stationary element and the moveable element and comprises a spring.

3. The device according to claim 2, wherein the propelling element comprises a wave spring.

4. The device according to claim 3, wherein the wave spring comprises a ribbon of metal having an oblong cross-section in the form of a repeated alternating bend, coiled approximately helically about an axis such that peaks of the alternating bend meet one another to increase a spring constant expressed along the axis.

5. The device according to claim 1, wherein the outboard side of the stationary element is configured to couple at least one accessory to the handlebar.

6. The device according to claim 1, wherein the protruding element comprises a pin.

7. The device according to claim 1, wherein the stationary element comprises a mounting recess configured to interface with an end of the handlebar.

8. The device according to claim 7, wherein the mounting recess is configured to interface with the end of the handlebar by at least partially enveloping the end of the handlebar.

9. The device according to claim 7, wherein the mounting recess is configured to interface with the end of the handlebar by being generally flush with the end of the handlebar.

10. The device according to claim 1, further comprising a mounting set comprising at least one fastener and at least one shim to couple the device substantially rigidly to the handlebar.

11. The device according to claim 10, wherein the device is compatible with a plurality of mounting sets.

12. The device according to claim 11, wherein each of the plurality of mounting sets has at least one of a differently sized fastener or a different number of shims than others of the plurality of mounting sets.

13. The device according to claim 12, wherein at least one of the plurality of mounting sets further comprises at least one of a nose or an adaptor.

14. The device according to claim 1, wherein the internal cutout has a first end and a second end, and wherein a depth of the internal cutout tapers toward each of the first and second ends.

15. The device according to claim 14, wherein the actuating cutout intersects the internal cutout orthogonally.

16. The device according to claim 15, wherein the actuating cutout intersects the internal cutout closer to the first end than the second end.

17. The device according to claim 1, wherein the propelling element transitions from the first state to the second state by rotation of the moveable element relative to the stationary element, wherein in the rotation the internal cutout guides the moveable element rotationally with respect to the protruding element and the stationary element until the actuating cutout aligns with the protruding element such that the actuating cutout then guides the moveable element linearly with respect to the protruding element and the stationary element with the moveable element propelled by the propelling element.

\* \* \* \* \*